United States Patent [19]

Kluger

[11] 4,227,594
[45] Oct. 14, 1980

[54] BACKING PLATE-WHEEL CYLINDER RETAINING CLIP

[75] Inventor: Michael A. Kluger, South Bend, Ind.

[73] Assignee: The Bendix Corporation, Southfield, Mich.

[21] Appl. No.: 33,086

[22] Filed: Apr. 25, 1979

[51] Int. Cl.³ ............................................. F16D 65/24
[52] U.S. Cl. .................................. 188/361; 24/217 R; 92/161; 188/325; 188/364; 248/27.3; 403/397; 403/406
[58] Field of Search ............... 188/361, 362, 363, 364, 188/365, 325; 403/292, 397, 405, 407; 92/16; 24/216, 217 R; 248/27.34

[56] References Cited

U.S. PATENT DOCUMENTS

| | | | |
|---|---|---|---|
| 2,271,899 | 2/1942 | Miller | 24/217 R |
| 2,327,605 | 8/1943 | Ryder | 24/217 X |
| 2,943,373 | 7/1960 | Rapata | 24/216 |
| 3,200,908 | 8/1965 | Budd et al. | 188/364 X |
| 4,061,429 | 12/1977 | Mathcies | 188/341 X |

Primary Examiner—George E. A. Halvosa
Attorney, Agent, or Firm—Paul David Schoenle; Ken C. Decker

[57] ABSTRACT

A brake assembly includes a backing plate, a pair of brake shoes slidably mounted on the backing plate, and a wheel cylinder supported on the backing plate between contiguous ends of the shoes. A retaining clip attaches the wheel cylinder to the backing plate. The retaining clip includes a base and a pair of opposed tabs extending from the base. One portion of each tab resiliently and releasably attaches the clip to the backing plate. Another portion of each tab projects into a recess in the wheel cylinder to resiliently and releasably retain the wheel cylinder in a mounted position on the backing plate. The clip and the wheel cylinder are capable of being attached to the backing plate from the same side of the backing plate.

7 Claims, 5 Drawing Figures

BACKING PLATE-WHEEL CYLINDER RETAINING CLIP

BACKGROUND OF THE INVENTION

This invention relates to a drum brake assembly for an automotive vehicle in which a retaining clip secures a wheel cylinder to a backing plate.

To assemble a drum brake, a wheel cylinder or hydraulic actuator must be attached to a backing plate so that the wheel cylinder can move a pair of brake shoes relative to the backing plate. On method of attaching a wheel cylinder to a backing plate is to bolt the wheel cylinder to the backing plate. However, this requires drilling holes in the wheel cylinder and drilling and taping the backing plate, or vice versa.

To eliminate the need for drilling and tapping, wheel cylinders have also been attached to backing plates by means of retaining clips. To use one such retaining clip, a portion of the wheel cylinder is inserted through an opening in the backing plate from one side of the backing plate. Then a retaining clip is fixed to the wheel cylinder portion from the other side of the backing plate to prevent the wheel cylinder portion from being withdrawn back through the backing plate opening. However, to utilize such a retaining clip, separate assembly steps must be performed from opposite sides of the assembly line where the brake is manufactured, or the backing plate must be flipped over 180°. It is desirable to provide a simplified brake assembly in which both the wheel cylinder and the retaining clip can be attached to the backing plate without access to both sides of the backing plate.

SUMMARY OF THE INVENTION

According to the present invention, a brake assembly, including a backing plate, a wheel cylinder and a retaining clip, is provided in which the retaining clip and the wheel cylinder are attached to the backing plate from the same side of the backing plate.

The backing plate includes an aperture for receiving a retaining portion of the wheel cylinder. The retaining clip includes a base from which extend a pair of flexible tabs. Each tab includes one detent portion which holds the clip to the backing plate and each tab also includes another detent portion which holds the wheel cylinder to the clip and thus, to the backing plate. The flexible tabs yield so that the clip may be installed on or removed from the backing plate, but the tabs recover to secure the clip to the backing plate. The flexible tabs also yield so that the wheel cylinder may be installed on or removed from the backing plate, but which recover to secure the wheel cylinder to the backing plate.

It is therefore an object of this invention to provide a retaining clip for attaching a wheel cylinder to a backing plate so that it is not necessary to drill or tap either the wheel cylinder or the backing plate.

It is also an object of this invention to provide a retaining clip, backing plate, and wheel cylinder assembly which permits the retaining clip and the wheel cylinder to be attached to the backing plate from the same side of the backing plate so that access to both sides of the backing plate during brake assembly is not required.

Finally, it is an object of this invention to provide a retaining clip which can be integrally formed out of a single disc of material.

DETAILED DESCRIPTION

Figure 1:
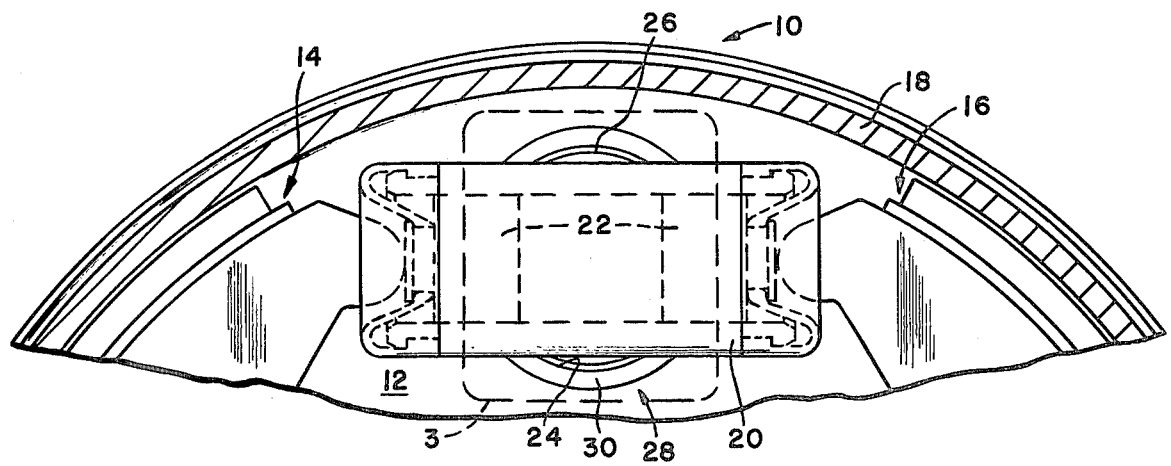
FIG. 1 is a front elevational view of a portion of a drum brake assembly made pursuant to the teachings of the present invention.

Referring to FIG. 1, a drum brake assembly 10 includes a backing plate 12 upon which a pair of brake shoes 14, 16 are movably mounted for engagement with a rotating brake drum 18. A wheel cylinder or hydraulic actuator 20 includes means 22 for moving the brake shoes relative to the backing plate 12. The backing plate 12 includes an opening or aperture 24 through which a stud or retaining member 26 of wheel cylinder 20, and through which installing means or retaining clip 28, is inserted. The backing plate 12, the retaining member 26 and the retaining clip 28 cooperate to resiliently and releasably hold the wheel cylinder 20 in a mounted position on the backing plate 12. Retaining clip 28 includes a discshaped base 30. A single line in FIG. 1 represents both the edge of the backing plate 12 surrounding the aperture 24 and the inside edge of base 30 of clip 28.

Figure 3:
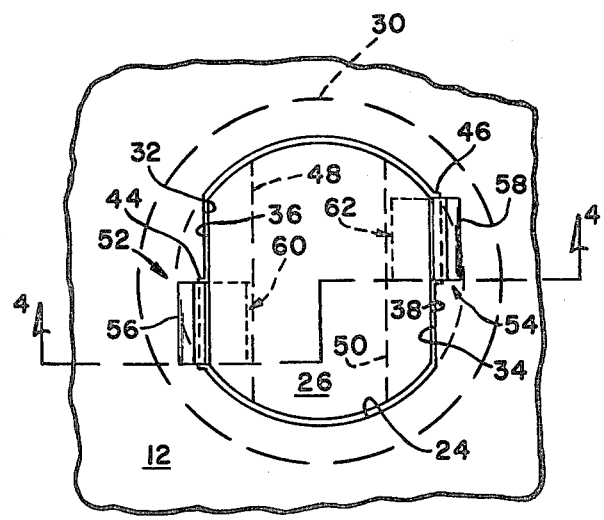
FIG. 3 is a back elevational view of the circumscribed portion of FIG. 1.
Figure 4:
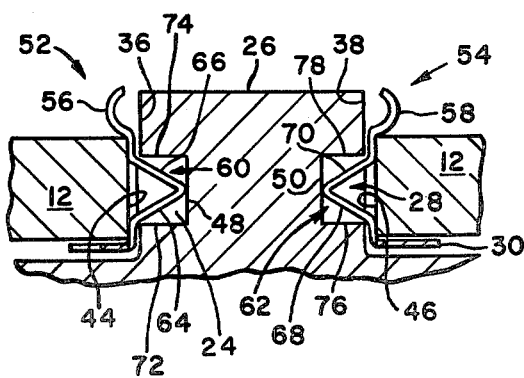
FIG. 4 is a cross-sectional view along line 4—4 of FIG. 3.

Referring to FIGS. 3 and 4, the backing plate opening 24 has opposed flat surfaces 32, 34. Wheel cylinder stud 26 includes opposed flat surfaces 36, 38. Finally, retaining clip disc 30 includes opposed inside flat surfaces 40, 42. These flat surfaces cooperate to prevent rotation of the wheel cylinder 20 relative to the backing plate 12. Backing plate 12 includes notches or recesses 44, 46 in the flat surfaces 32 and 34. Wheel cylinder stud 26 includes slots or recesses 48, 50 with bottom surfaces recessed from peripheral stud surfaces 36, 38 and which extend tangentially through stud 26.

Figure 2:
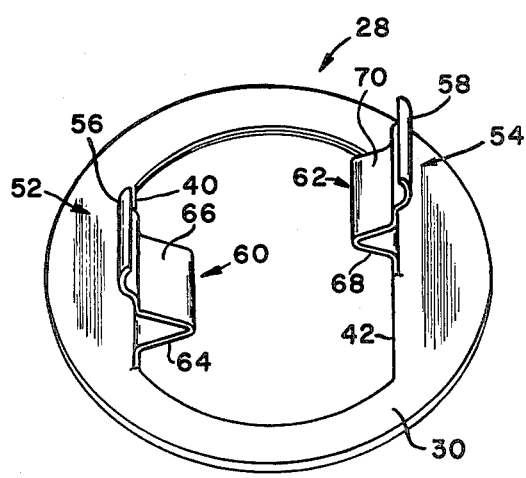
FIG. 2 is an oblique view of a retaining clip made pursuant to the applicant's invention.

Referring now to FIGS. 2, 3, and 4, flexible tabs 52, 54 extend from base 30 of retaining clip 28 and through notches 44 and 46 of backing plate 12. Tabs 52, 54 are such that they can be integrally formed out of a single disc of retaining clip material. Flexible tabs 52, 54 include arcuate backing plate engaging members 56 and 58 at the distals ends of tabs 52 and 54, respectively. The backing plate 12 is resiliently and releasably held between engaging members 56, 58 which engage one side of the backing plate 12, and base 30, which engages the other side of backing plate 12. Tabs 52, 54 also include detents or wheel cylinder engaging members 60, 62 which project into wheel cylinder slots 48, 50 to fasten the retaining clip 28 to the wheel cylinder 20. Projections 60 and 62 are made up of flexibly interconnected arms 64, 66 and 68, 70 respectively, which are engageable with edges 72, 74 and 76, 78 respectively, of slots 48 and 50 so that the retaining clip 28 is resiliently and releasably held to the wheel cylinder 20. In the embodiment illustrated in FIGS. 2, 3, and 4, the wheel cylinder engaging members 60, 62 are disposed between the base 30 and the backing plate engaging members 56 and 58, respectively. With respect to flexible tab 52, the arm 64 is connected to base 30 and to arm 66 which in turn is connected to engaging member 56. With respect to flexible tab 54, arm 68 is connected between base 30 and arm 70 which, in turn, is connected to engaging member 58. The distal ends of projections 60, 62 are defined by the intersection of legs 64 and 66 and by the intersection of legs 68 and 70, respectively.

Figure 5:
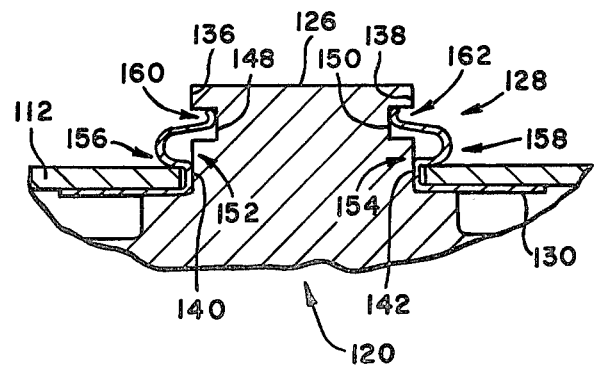
FIG. 5 is a cross-sectional view similar to FIG. 4 showing an alternate embodiment of applicant's invention.

FIG. 5 illustrates an alternate embodiment of applicant's invention with parts indicated by reference numerals obtained by adding 100 to the reference numerals of similar parts illustrated in FIG. 4. In retaining clip 128, the backing plate engaging members consist of detent portions 156, 158 which engage one side of the backing plate 112. Clip 128 is resiliently and releasably held to backing plate 112 between engaging members 156, 158 and base 130 which engages the other side of backing plate 112. The wheel cylinder engaging members consist of detent portions 160, 162 which are formed at the ends of flexible tabs 152, 154 and which extend into slots 148, 150. The backing plate engaging members 156, 158 are disposed between the base 130 and wheel cylinder engaging members 160 and 162, respectively. Engaging member 160, 162 cooperate with slots 148, 150 to resiliently and releasably hold clip 128 to wheel cylinder 120.

MODE OF OPERATION

To attach wheel cylinder 20 to the backing plate 12, the retaining clip 28 is first inserted into backing plate opening 24. This is accomplished by positioning clip 28 adjacent one side of the backing plate 12 and aligning tabs 52, 54 with backing plate flats 32, 34, and then moving clip 28 toward backing plate 12 with base 30 trailing.

The outwardly facing arcuate surfaces of engaging members 56, 58 engage the wall of backing plate adjacent opening 24 and this engagement causes tabs 52, 54 to yield toward each other so that tabs 52, 54 can be inserted further into opening 24 until base 30 engages the one side of the backing plate 12. At this point, tabs 52, 54 recover so that the backing plate 12 is resiliently and releasably held between base 30 and engaging members 56 and 58, as best seen in FIG. 4. By pinching tabs 52, 54 toward each other, clip 28 can be removed from the backing plate 12.

After clip 28 is attached to backing plate 12, the wheel cylinder 20 can then be attached to the backing plate 12. First, stud 26 of wheel cylinder 20 is positioned adjacent backing plate opening 24, on the side of the backing plate from which clip 28 was inserted, with the various flat surfaces aligned. Wheel cylinder 20 is then moved toward backing plate 12. As wheel cylinder 20 moves toward backing plate 12, the stud 26 engages projections 60 and 62 which flatten out or yield to allow stud 26 to be further inserted into opening 24. Eventually, a point is reached wherein projections 60, 62, recover to project into slots 48, 50 to resiliently and releasably hold the wheel cylinder 20 to clip 28, and thus, to backing plate 12 in the mounted position as shown in FIG. 4, wherein the slots or recesses 48, 50 are disposed within the backing plate opening 24 and are facing toward the wall opening 24 of backing plate opening 24. In this manner, both clip 28 and wheel cylinder 20 are attached to backing plate 12 without access to both sides of backing plate 12.

To remove wheel cylinder 20 from the mounted position on backing plate 12, axial tension is applied to tabs 52, 54 so that engaging members 56, 58 are pulled away from base 30. This causes engaging members 60, 62 to flatten and retract from slots 48, 50 so that wheel cylinder stud 26 can then be withdrawn from the backing plate opening 24. When the tension is removed after wheel cylinder portion 26 is removed, the clip 28 will remain attached to the backing plate 12.

The embodiment illustrated in FIG. 5 is assembled in essentially the same manner as that of FIGS. 2, 3, and 4. However, to remove wheel cylinder 120 from its mounted position, engaging members 160, 162 are removed from slots 148, 150 by separating engaging members 160, 162 radially away from each other. This permits wheel cylinder stud 126 to be withdrawn from the backing plate opening while the retaining clip 128 remains attached to the backing plate 112.

I claim:

1. In a drum brake assembly, a wheel cylinder including a stud projecting therefrom, the stud having a pair of recesses extending tangentially through the peripheral surface thereof and including edge portions on oppositely facing walls, a backing plate having a walled aperture therewithin and retaining means for releasably holding the wheel cylinder in a mounted position on the backing plate wherein the stud is received by the aperture, the retaining means comprising:

an annular base disposed between the wheel cylinder and the backing plate; and a pair of flexible tabs extending axially away from the base and projecting into the aperture when the retaining means is installed on the backing plate, each tab having one end secured to the base, the opposite end of each tab defining a portion grasping the backing plate, the portion of each tab interconnecting the ends of the tab including a flexible projection comprising a pair of intersecting legs, each recess receiving a corresponding one of the projections and the edge portions of the recess engaging the legs of the corresponding projection to hold the wheel cylinder in the mounted position wherein the recesses are disposed within the backing plate aperture and are facing toward the wall of the backing plate aperture.

2. In a drum brake assembly, a wheel cylinder including a stud projecting therefrom, the stud having a recess defined in the peripheral surface thereof and including edge portions on oppositely facing walls, a backing plate defining a walled aperture therewithin and retaining means for releasably holding the wheel cylinder in a mounted position on the backing plate wherein the stud is received by the aperture, the retaining means comprising:

a base disposed between the wheel cylinder and the backing plate; and a flexible tab extending from the base and projecting into the aperture when the retaining means is installed on the backing plate, one end of the tab being secured to the base, the opposite end of the tab defining a portion grasping the backing plate, the portion of the tab interconnecting the ends of the tab including a flexible projection comprising a pair of intersecting legs, the recess receiving the projection and the edge portions of the recess engaging the legs of the projection to hold the wheel cylinder in the mounted position wherein the recess is disposed within the backing plate aperture and faces the wall of the backing plate aperture.

3. The retaining means of claim 2 wherein:

the legs are flexible relative to each other to permit flattening of the projection and withdrawal of the projection from the recess in response to a force applied to the tabs and directed away from the base, the withdrawn projection permitting removal of the wheel cylinder from the mounted position on the backing plate.

4. The retaining means of claim 2, wherein: the axial force is applied to the opposite end of the tab to move the opposite tab end away from the base to thereby flex the legs relative to each other and to flatten the projection.

5. The retaining means of claim 2, wherein said opposite end of the tab comprises an arcuate surface, portions of the arcuate surface being engageable with the backing plate as the flexible tab is inserted into and removed from the backing plate aperture.

6. The drum brake assembly of claim 2, wherein: the wheel cylinder stud defines an alignment surface engageable with a corresponding alignment surface defined by the wall of the backing plate aperture, these alignment surfaces cooperating to prevent rotation of the wheel cylinder relative to the backing plate when the wheel cylinder stud is received by the backing plate aperture.

7. The drum brake assembly of claim 2, wherein the wall of the backing plate aperture defines a recess therein for receiving the interconnecting portion of the tab.

* * * * *